United States Patent [19]

Saito et al.

[11] Patent Number: 4,850,268

[45] Date of Patent: Jul. 25, 1989

[54] MULTI-PURPOSE, MOBILE LABORATORY ROOM

[75] Inventors: Kenichiro Saito; Shigeyuki Aoyama, both of Tokyo, Japan

[73] Assignee: Aoki Corporation, Osaka, Japan

[21] Appl. No.: 69,075

[22] Filed: Jul. 2, 1987

[30] Foreign Application Priority Data

Oct. 29, 1986 [JP] Japan .................. 61-257954

[51] Int. Cl.⁴ .............................. F24F 7/08
[52] U.S. Cl. .................... 98/33.1; 52/167; 52/173 R; 55/267; 55/279; 55/385.2; 98/1.5; 422/187
[58] Field of Search ............. 98/1.5, 33.1, 31.5, 98/31.6, 34.5, 34.6; 52/167, 347, 346, 173 R, 573, 480; 422/129, 187, 1, 40; 55/385 A, 267, 279

[56] References Cited

U.S. PATENT DOCUMENTS

| | | | |
|---|---|---|---|
| 3,294,480 | 12/1966 | Potapenko | 98/33.1 X |
| 3,334,547 | 8/1967 | Ruskin et al. | 55/385 A X |
| 3,761,068 | 9/1973 | Suh | 52/167 X |
| 3,926,597 | 12/1975 | Landy | 98/115.3 X |
| 3,946,645 | 3/1976 | Evans | 98/33.1 X |
| 4,485,729 | 12/1984 | Crittenden et al. | 98/1.5 |
| 4,502,164 | 3/1985 | Gemmell | 422/1 |
| 4,608,063 | 8/1986 | Kurokawa | 55/267 X |
| 4,663,122 | 5/1987 | Sparks | 422/297 X |

FOREIGN PATENT DOCUMENTS

| | | |
|---|---|---|
| 180139 | 5/1986 | European Pat. Off. . |
| 737609 | 6/1980 | U.S.S.R. ................ 52/167 |
| 960490 | 6/1964 | United Kingdom . |
| 1591558 | 6/1981 | United Kingdom . |
| 2105761 | 3/1983 | United Kingdom . |

*Primary Examiner*—Harold Joyce
*Attorney, Agent, or Firm*—Armstrong, Nikaido, Marmelstein, Kubovcik & Murray

[57] ABSTRACT

A multi-purpose laboratory room for mobile applications. The room comprises a housing structure having an airtight laboratory unit and an entrance unit, an air-conditioning and exhausting equipment unit to be installed in the upper part of the housing structure and a drain processing equipment unit to be equipped in the airtight laboratory unit. The clean levels of the laboratory unit and drain processing can be selected in multiple steps by electrical signal control.

The laboratory room is composed of the hollow wall structure in the wall, floor and ceiling, in which air pressure in the hollow parts are controlled. The filter is provided with a heating device. In addition, an autoclave automatic sterilizing device is incorporated for processing drain. A suspension type vibration-isolating device is also equipped.

2 Claims, 9 Drawing Sheets

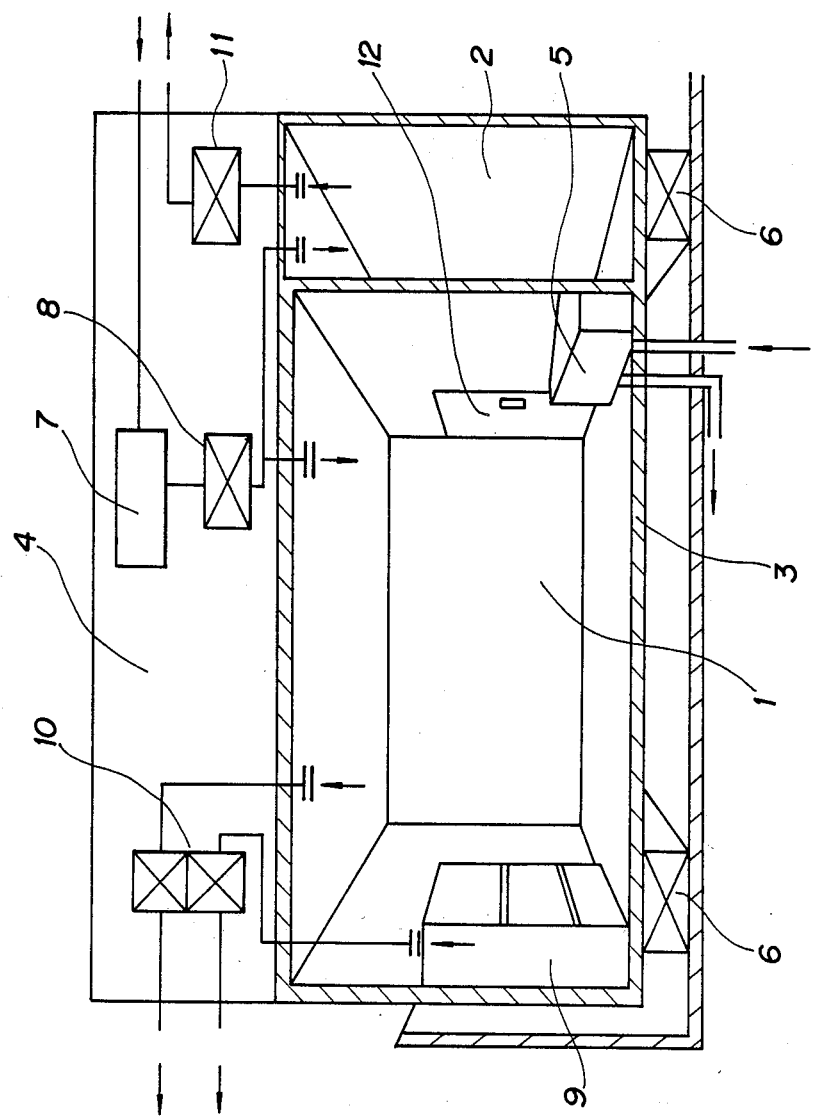

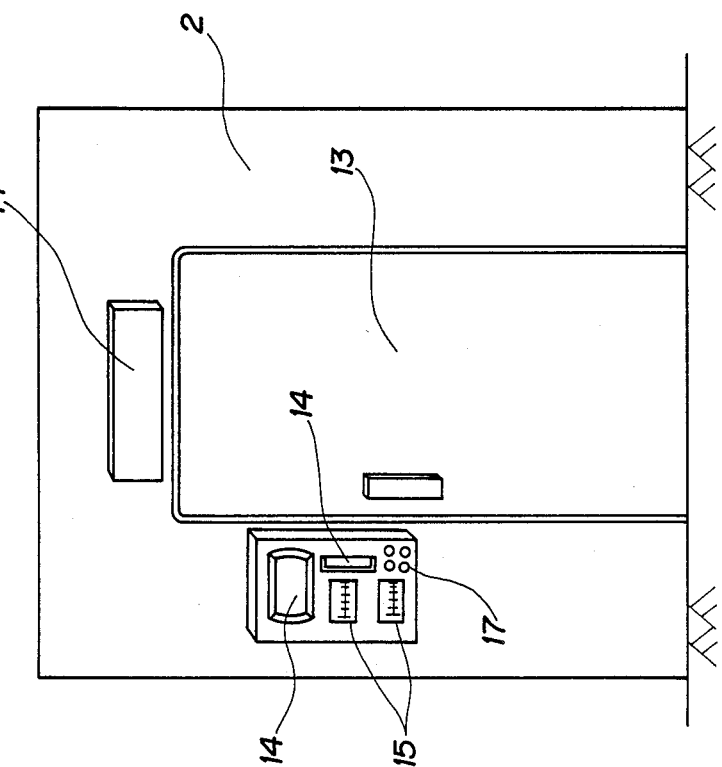
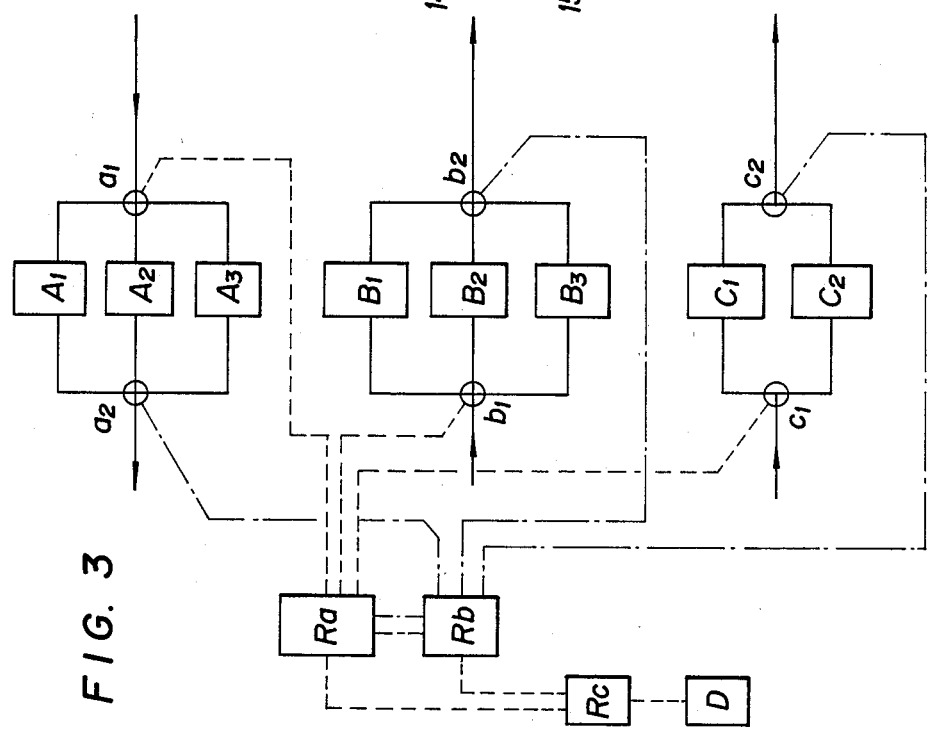

MULTI-PURPOSE, MOBILE LABORATORY ROOM

TECHNICAL FIELD OF THE INVENTION

This invention relates to a multi-purpose mobile laboratory room. In more detail, the invention relates to the structure of a multi-purpose mobile laboratory room that can be used as a clean room or biological clean room, etc. bile installation.

DESCRIPTION FOR BACKGROUND TECHNOLOGY

Clean laboratory room, that maintains clean space without discharging toxic matter or pathogenic germ, is strongly demanded as electronic and semiconductor industry and biotechnology remarkably progress.

For example, the bio-clean room in a biological containment such as $P_2$ or $P_3$ is installed in universities, institutes, hospitals and works, thereby preventing spreading of pathogenic microorganism, permeable matter, tissue specimen, etc.

However, conventional laboratory rooms based on the prior art, particularly those of higher hermetical sealing property such as clean rooms and bio-clean rooms require huge amount of cost for installation. In addition, these rooms must be installed as a fixed construction facility for single objective in many cases according to the state of the present art. Such a fixed type facility cannot be moved easily even where the environmental conditions in the installation site or experimental field may change.

In addition, the structure of the laboratory room cannot be changed so easily. It is more difficult to modify air conditioning and water supply/drain systems equipped in the clean room or bio-clean room, than restructuring the test set up used in the laboratory room.

According to the past practice based on the prior art, a simple experimental space is often structured on a motor driven vehicle, aiming at testing microbe in lake or soil or measuring climatic conditions, etc. However, no such laboratory room, that the air-conditioning and water supply/drain systems can be maintained at high levels according to requirements while assuring airtightness as high as $P_2$ or $P_3$ together with absolute safety as a clean room, is known in the prior art.

In this regard, it has been strongly demanded to develop such a laboratory room as mobile for installation while forming medium-scale experimental space with the air-conditioning and water supply/drain systems in required levels of absolute safety, at low cost.

DISCLOSURE OF THE INVENTION

An objective of the present inventions to improve the defects of conventional laboratory rooms, as described before, and to provide a new package type laboratory room that can be used for multiple purpose and moved freely for installation at different places while maintaining excellent hermetically sealing properties and safety.

To realize this objective, a multi-purpose mobile laboratory room based on the present invention comprises a housing structure having an airtight laboratory unit and an entrance unit, an air-conditioning and exhausting unit to be equipped in the upper part of the said housing structure and a drain processing unit to be placed in the airtight laboratory room, while being composed of a package type chamber that is mobile for installation at different places. A feature of this laboratory room is that the airtightness of the laboratory unit and the level of drain processing can be selected in multiple stages.

According to another feature of the laboratory room based on the present invention, there is an electrical signal control system that can control the air-conditioning and exhausting system, the drain system and the level of the hermetic sealing of the laboratory unit exactly according to the purpose of application. In addition, still another feature of the laboratory room according to the present invention is that the floor, wall and the ceiling comprise a hollow wall structure. Furthermore, the laboratory room based on the present invention is equipped with a sterilizing filter, and air-conditioning and exhausting system, an automatic autoclave sterilizing device in the drain system and a vibration-isolating device based on the pendulum swinging system, etc.

BRIEF DESCRIPTION OF THE DRAWINGS

FIG. 2 is a section of the outline view.

FIG. 3 illustrates the electrical signal control system.

FIG. 4 denotes the vicinity of the entrance unit.

FIGS. 10 and 1 indicate an automatic autoclave sterilizing device.

FIGS. 12, 13, 14 and 15 show the examples vibrationisolation devices.

DETAILED DESCRIPTION

The multi-purpose, mobile laboratory room, constructed according to the present invention has such a size and weight as transportable by means of a large trailer or railway. Its typical shape is shown by an example of FIG. 1.

Figure 1:
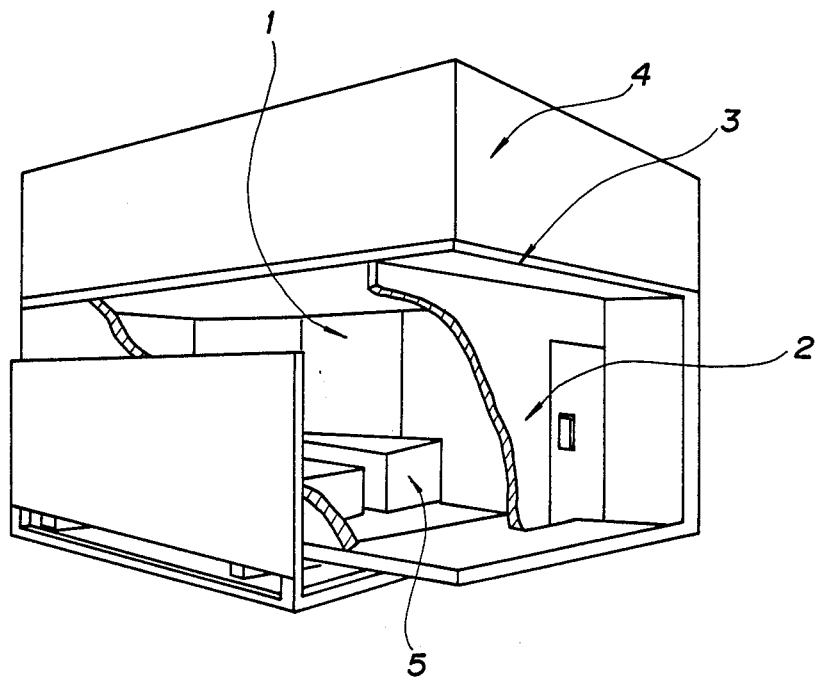
FIG. 1 shows an outline of the multi-purpose laboratory room that can be moved for changing installation position.

Referring to FIG. 1, the multi-purpose mobile laboratory room comprises a housing structure (3) having an airtight laboratory room unit (1) and an entrance unit (2), an airconditioning and exhausting equipment unit (4) to be installed in the upper part of said housing structure (3) and a drain processing equipment unit (5) to be housed in said airtight laboratory unit (1). The housing structure (3) and the air-conditioning and exhausting unit (4) are freely separated and assembled. Therefore, these structure and unit can be transported to a site of the laboratory room and assembled in place.

In addition, a vibration-isolating device can be attached to the base of this laboratory room, installable after movement.

FIG. 2 shows a general section of the multi-purpose mobile laboratory room based on the present invention.

A vibration-damping and -isolating device (6) is peripherally equipped in the base part to cope with fine and precision measurement, super-trace analysis or handling of toxic sample or reagent, etc.

Now the air-conditioning and exhausting system is described referring to this FIG. 2. For example, air-cooled package air-conditioner (7) supplies airtight laboratory unit (1) and entrance unit (2) with external air. At that time, filter (8) cleans and sterilizes the air. Exhaust gas, evolved from airtight laboratory unit (1) and cabinet (9), etc., is passed through filter (10) to prevent leak of pathogenic microorganism to outer environment. In addition, exhaust gas discharged from entrance unit (2) is also filtrated by filter (11).

Airtight laboratory unit (1) is shut off from entrance unit (2) by means of a solenoid driven door (12). The conditions of air flow in the entrance unit are controlled, using air curtain, etc.

In order that the laboratory room is applicable to various purposes, the levels of airtightness in laboratory unit (1) and cleanliness in the air-conditioning and exhausting system and the drain system are controlled by electrical signals. The signals control to select any level of, for example, $P_1$, $P_2$, $P_3$ and $P_4$ to confine microbe in the bio-clean room.

FIG. 3 shows an example of the control system. The processing levels in filters $A_1$, $A_2$, $A_3$ in the suction system, filters $B_1$, $B_2$, $B_3$ in the exhaust system and drain processing systems $C_1$, $C_2$ are transmitted to controllers $a_1$, $b_1$, $c_1$ that are activated by the signals from a transmitting unit Ra, for selecting required levels. At the same time, monitors $a_2$, $b_2$, $c_2$ sense the levels while transmitting sensed results to a monitoring unit Rb. Units Ra and Rb compare instruction signals with monitored results. Compared result is evaluated by a check unit Rc.

A display device D controls to display whether required levels are correctly maintained or not and whether control instructions are changed, in the laboratory unit and outside, particularly near the entrance. The laboratory room, when the laboratory room is operated in high risk levels, requires qualified operator. For this purpose, a checking device for ID card, etc. can also be equipped near the entrance to confirm the qualifications of an entering person.

Referring to FIG. 4 which shows the vicinity of the entrance for the laboratory room, a door (13), that can be opened and closed while being controlled by a solenoid switch, etc., at the gate of entrance unit (2). A display device (14) is equipped in the upper part of this door (13), for displaying the operating conditions and levels of the laboratory room. Other device (140, e.g., TV camera for showing interior of the laboratory room, environmental display device (15) for showig room temperature, pressure, humidity cleanliness, etc. and ID card checking device (14) connected with display device (14) and others for confirming qualifications of entering person. The levels of the laboratory room can be set as required by means of a select switch (17).

Figure 5:
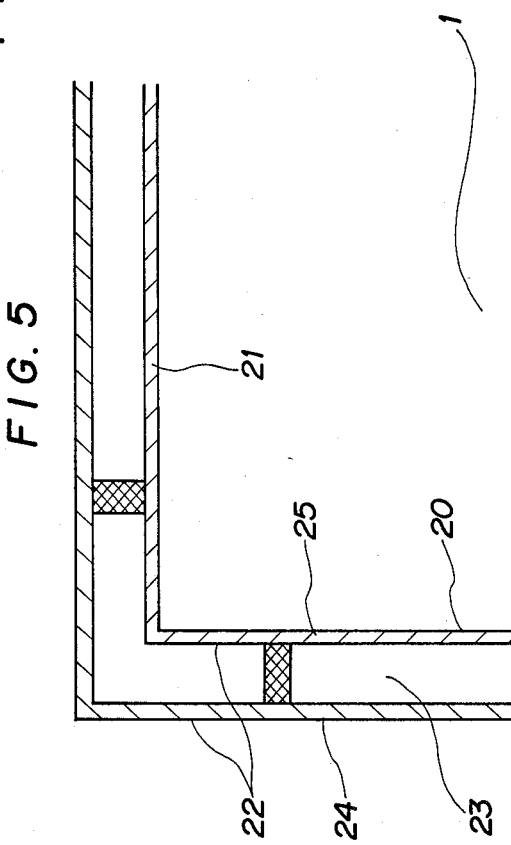
FIG. 5 shows the sectional view of wall face, ceiling and floor face.

According to an object of this invention referring to FIG. 5, a hollow wall structure (22) can apply to floor (19), wall (20) and ceiling (21) that constitute the multi-purpose mobile laboratory room, thereby constructing an airtight laboratory room, where air pressure in this hollow structure is made higher or lower than the atmospheric pressure. Where the floor, wall and the ceiling that constitute the laboratory unit and the entrance unit comprise a hollow structure thereby constructing the laboratory room airtight, the pressure of air in said hollow structure can be controlled. When said pressure is made higher than the atmospheric pressure, it is completely prevented that air in or outside the laboratory room enters interior (23) of hollow structure (22) even if floor (19), wall (20) or ceiling (21) of the laboratory room is cracked, drilled or gapped, because air pressure in interior (23) of hollow structure (22) is higher than air pressures outside the hollow structure, although air in interior (23) of hollow structure (22) into the laboratory room or outside of both hollow structure and laboratory room. Consequently, the inner and outer parts of the laboratory unit can be completely shielded from each other. Therefore, it never occurs that external dust or dirt enters the clean room or other laboratory room or toxic matter or bacteria, etc. confined in the laboratory room leak to the outside.

In addition, outer panels (24) and inner panels (25), constituting wall (20) and ceiling (21), may be composed of transparent plates such as transparent acryl resin, if required. Thereby, the interior of laboratory room (1) can be illuminated or observed from the outside.

The air pressure in interior (23) of hollow Structure (22) may be maintained at the atmospheric pressure $\pm 15$ mm $\sim 30$ mm $H_2O$. Furthermore, safety for preventing bio-hazard can be improved by supplying interior (23) with sterilized gas instead of air.

In addition, bio-hazard preventive function can be greatly improved. Therefore, installation of the glove box in laboratory room (1), conventionally used in the systems known in the prior art, is no longer required while realizing suit laboratory where operations are carried out more easily at lower cost.

According to a principle of the present invention, pressure in the interior of the clean room can be made atmospheric. Therefore, each person entering the clean room can easily open and close the door without creating backup phenomena of drain thus remarkably improving workability.

According to another principle of this invention, no surplus space such as round corridor need not be provided around the clean room, contrary to conventional methods where such space was required as a semi-hot area. Accordingly, area for installing the clean room can be greatly reduced together with additional cost.

With the laboratory room based on the present invention, it is possible to provide a heating means in the filter equipped in the connection passage to the outside from the interior of the air conditioning and exhausting system, as a sterilizing filter.

Where the laboratory room is used as a bioclean room, it is well known in the prior art that object bacteria, viruses, etc. are easily sterilized by heating at, for example, 150° C.~180° C. Therefore, the bacteria and viruses can be pasteurized 100% by providing a heating means in the filter and heating the bacteria and viruses that are passing through the filter. Accordingly, biologically 100% clean containment is enabled with a biologically 100% clean space.

In addition, this filter can completely kill the bacteria and viruses, collected in the filter, by using the heating means of the filter. Therefore, no operators for environments are contaminated when the filter is replaced.

Figure 6:
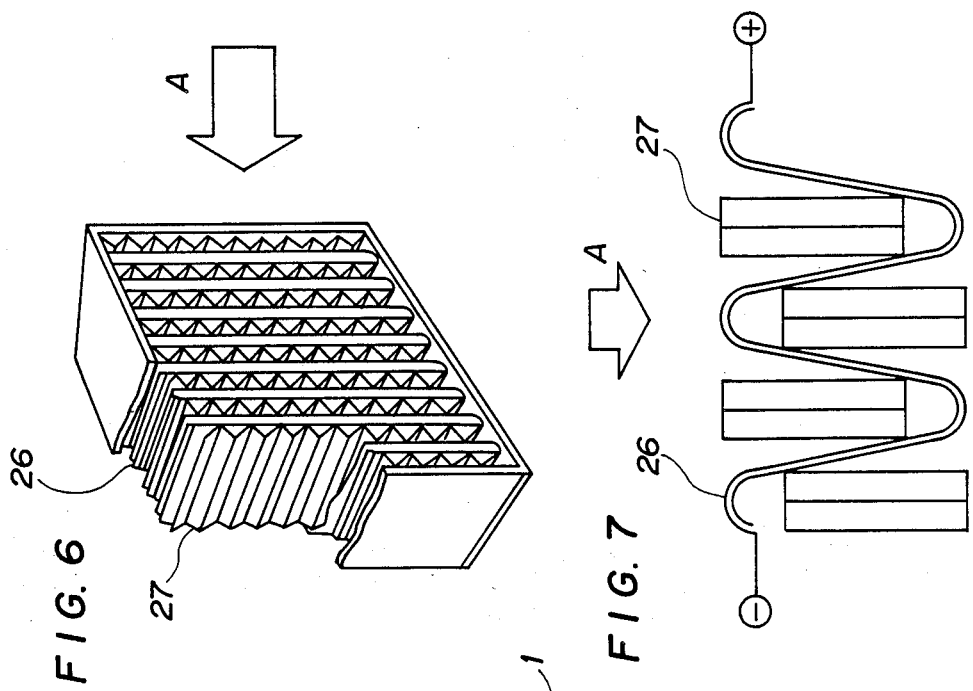
FIGS. 6 and 7 are the illustration for showing an example of sterilizing filter to be used for the laboratory room constructed according to the present invention.
Figure 7:
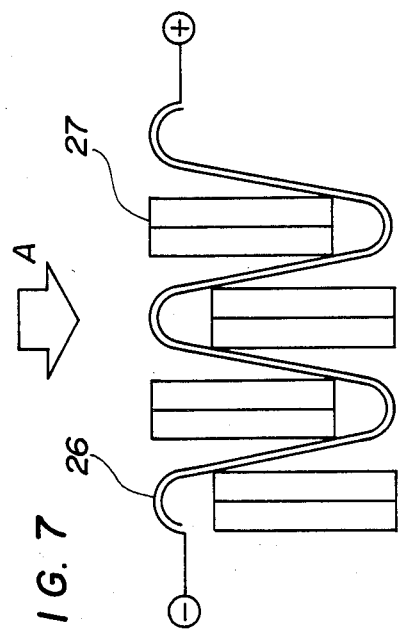

FIGS. 6 and 7 show an example where a heating means is provided in the medium of the filter. A high-frequency heating means may also be equipped in the filter.

Referring to FIG. 6, a sheet-like filter material (filter paper) (26) contains the electric wire in zigzig from, thus filter material (26) is heated by applying current to the electric heating wire. The electric heating wire may comprise, for example, nichrome wire. A resistance wire may be printed on filter material (26). No heating means is located in separator (27).

When the electric heating wire is energized, filter material (26) is heated. When air enters the filter and passes filter material (26) as shown by Arrow A, bacteria and viruses contained in the air collected while bacteria and viruses adhering on filter material (26) being heated and sterilized.

Figure 8:
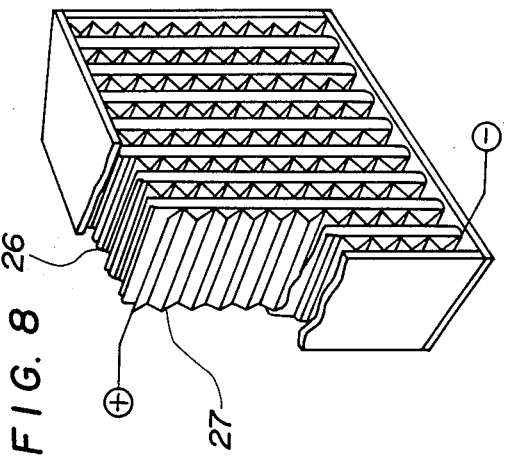
FIGS. 8 and 9 show other examples.
Figure 9:
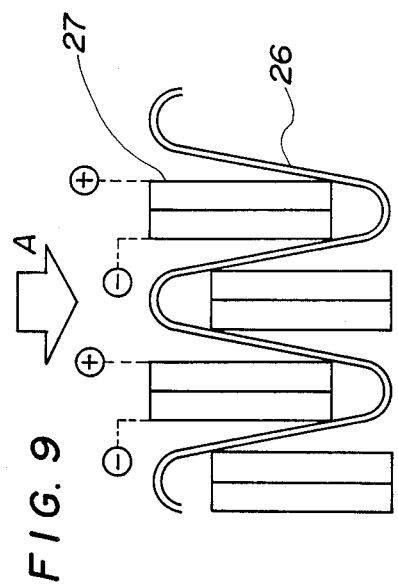

FIGS. 8 and 9 show another example in which a heating means is equipped in separator (27) of filter (26).

Separator (27) comprises a heating body (e. g., nichrome plate) having electric resistance, available for applying current.

In this case, too, bacteria and viruses contained in air that enters in the direction of arrow A can be pasteurized by applying curent to separator (27), because nearby filter material (26) is also heated when separator (27) is heated.

The heating means may also be equipped in the air inlet of the filter.

A drain sterilizing device can be used with the laboratory room based on the present invention. This device comprises an autoclave capable to perform automatic sterilizing treatment, a pressurizing and heating control system for said autoclave, a drain control system for inflow and discharge to/from said autoclave and a filter system for drain, exhaust and air supply.

Figure 10:
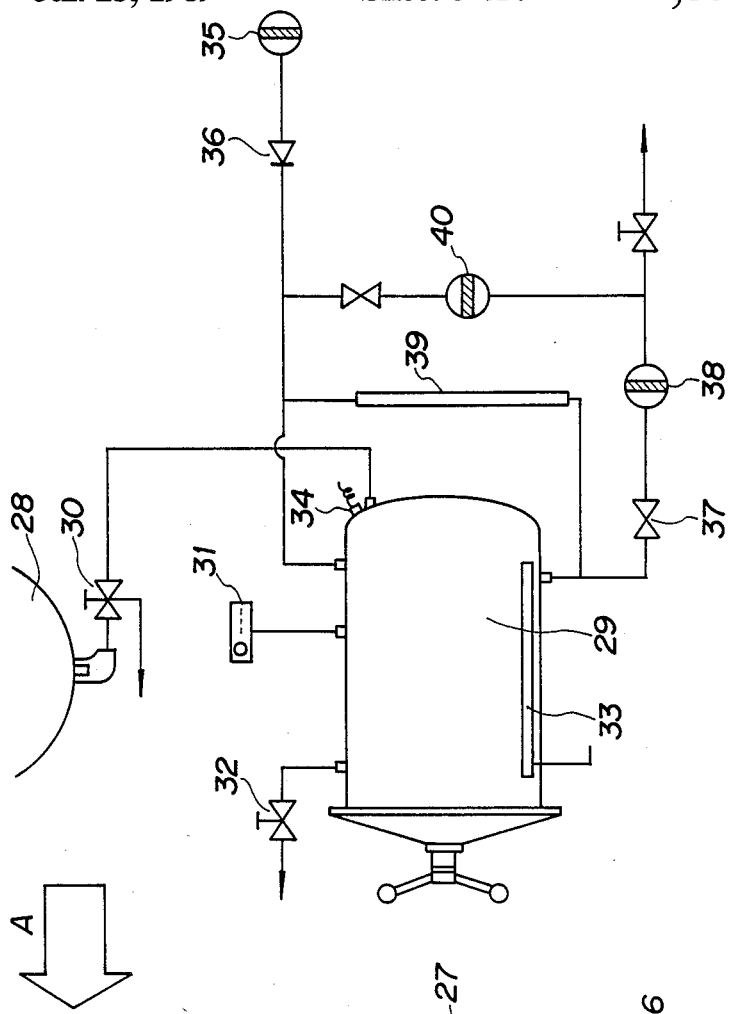

FIG. 10 shows a typical system of the drain sterilizing device based on the present invention. Referring to FIG. 10, drain is led into autoclave (29) capable to automatically sterilize, directly from hand washer (28). A select vale (30) is provided at an intermediate point of the passage. The rate of drain, flowing into autoclave (29) is controlled by using this valve (30). When autoclave (29) is in sterilizing process, water supply to the hand washer may be automaticalloy stopped or drain may be temporarily stored.

Autoclave (29) is provided with a pressure gauge and pressure controller (31), safety valve (32), heater (33) and temperature sensor (34).

Air is supplied to the autoclave through air filter (35) and check valve (36). Drain from autoclave (29) is discharged via valve (37) and drain filter (38).

There are water level gauge (39) and steam filter (40) equipped for connecting the air supply system and flow control valve, etc. may also be provided at suitable positions in the piping.

An example of autoclave (29) may comprise a size of about 50 l to be operated under typical conditions of maximum operating pressure of $2 \sim 3$ kg/cm$^2$G at a temperature of $110 \sim 200°$ C. Typically, the autoclave may be operated as follows. When washing water is introduced, select valve (30) is turned ON and, while flowrate is being measured using the water level gauge, the rate of inflow is controlled. At full level, alarm is issured by signal (buzzer) or water supply to the hand washing machine may be automatically stopped. It is also possible that, after completion of automatically sterilizing, drain is automatically begun.

Filter (35), (38) and (40) in use may comprise, for example, the filter of 0.22, 99.97% level of Class P$_3$.

Other apparatuses, to be possibly incorporated, may include the following for example.

(1) Sterilization timer (about 60 minutes)
(2) Water level alarm device
(3) Dry heating alarm device
(4) Piping Sterilizing system after filter replacement
(5) Lead circuit breaker Power supply, for the example above, may comprise AC 100 V, 1$\phi$, about 6 KW.

Figure 11:
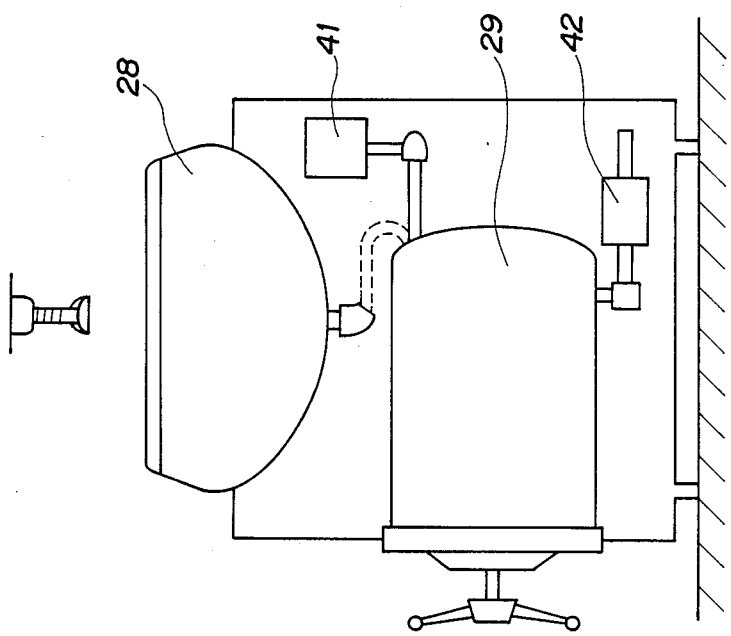

FIG. 11 shows an example of autoclave based on the present invention, equipped immediately underneath the hand washing device. Autoclave (29) is equipped under hand washing device (28), around which the foregoing devices and apparatuses are arranged. The configurtion is extremely compact. Water supply solenoid valve (41) and drain solenoid valve (42), etc. automatically control the sterilizing device.

The drain sterilizing device of the present invention is not limited to the foregoing example, as a matter of course. Suitable changes may be incorporated in the capacity of the autoclave, control system, piping system, safety system, etc. In addition, the position of installing the autoclave may also be changed according to particular preference.

The present invention offers a compact system and devices as described above, that can effectively prevent hazards due to pathogenic microorganism or RI contamination, etc. In addition, the present invention realizes a low-cost but high-efficiency drain sterilizing device.

The multi-purpose mobile laboratory room, according to the present invention, must be installed in stable state. In particular, structural stability is absolutely required where the room is used for precision measurement, microanalysis, measurement of high-risk specimens or reagents. To cope with such applications, the present invention provides a suspension type vibration-isolating device.

According to the suspention type vibration-isolating device of the present invention, a vibration-isolating rubber is used at the fulcrum of pendulum which is allowed to swing by the elastic deformation of fed vibration-isolating rubber.

The package type mobile laboratory room, based on the present invention, is supported in suspension to the foregoing vibration-isolating device.

Figure 12:
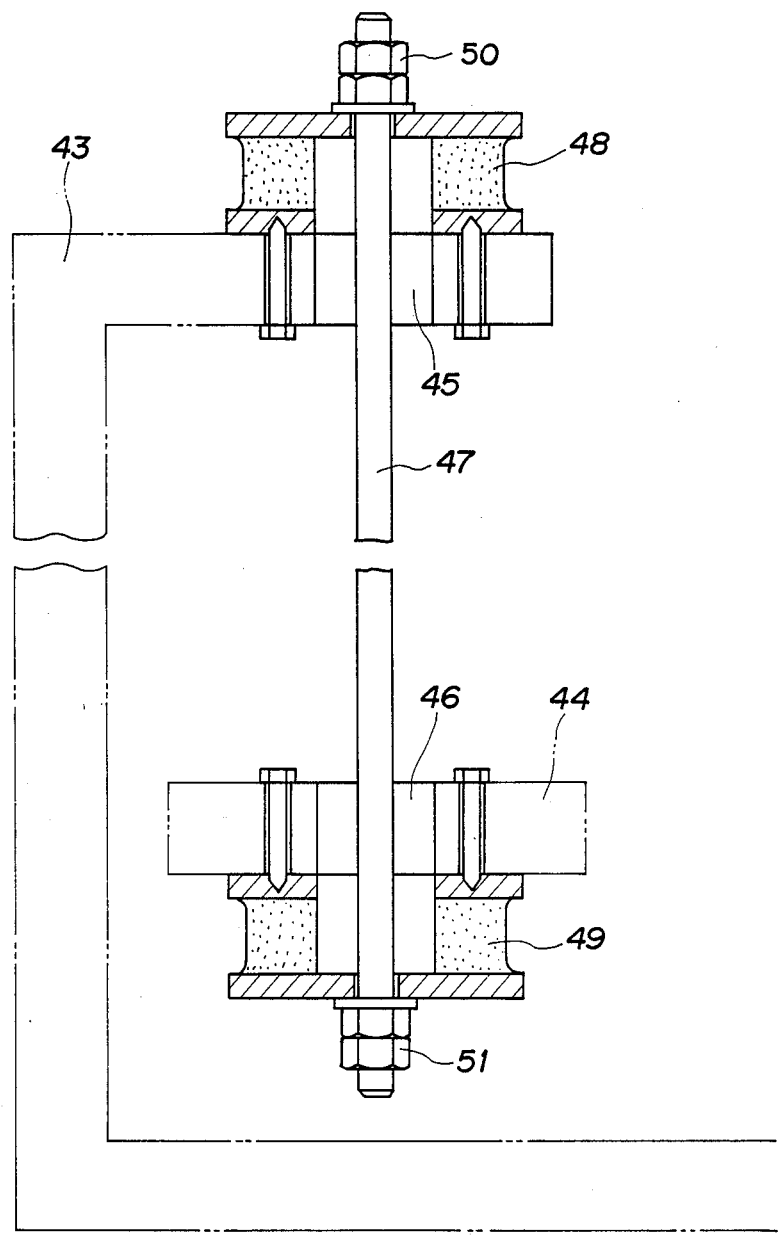
FIG. 12 shows an example of vibration-isolation device.

FIG. 12 shows the section of an example of the vibration-isolating device according to this invention. In FIG. 12, an assembled structure, comprising upper rack (43) installed in the ground side and a lower rack (44) supporting the structure, is provided with a pendulum (47) which is penetrated into a hole (45) equipped at the fulcrum in the upper part of upper rack (43) and a hole (46) drilled in lower rack (44).

This pendulum (47) is supported with a vibration-isolating rubber (48) at the fulcrum of upper rack (43) and by a vibration-isolating rubber (49) also at the fulcrum of lower rack (44). Both upper and lower ends of pendulum (47) are fixed by bolt nut structures (50), (51).

Figure 13:
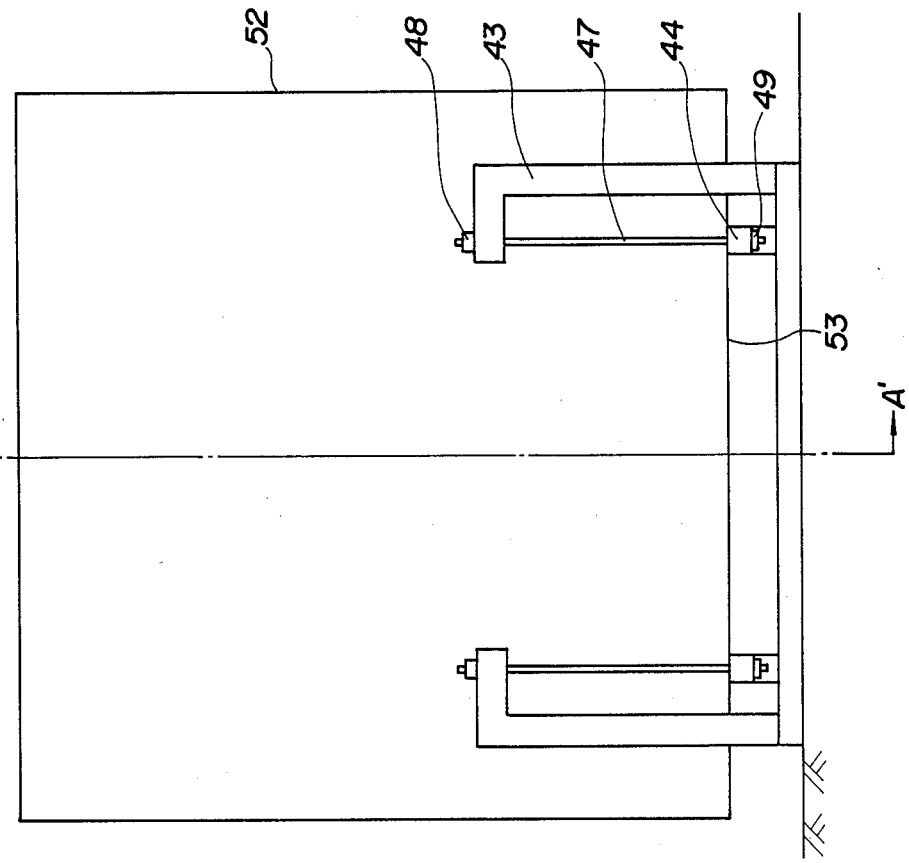
FIG. 13 shows the front elevation of the vibration-isolation device of FIG. 12 supporting a package type laboratory room.
Figure 14:
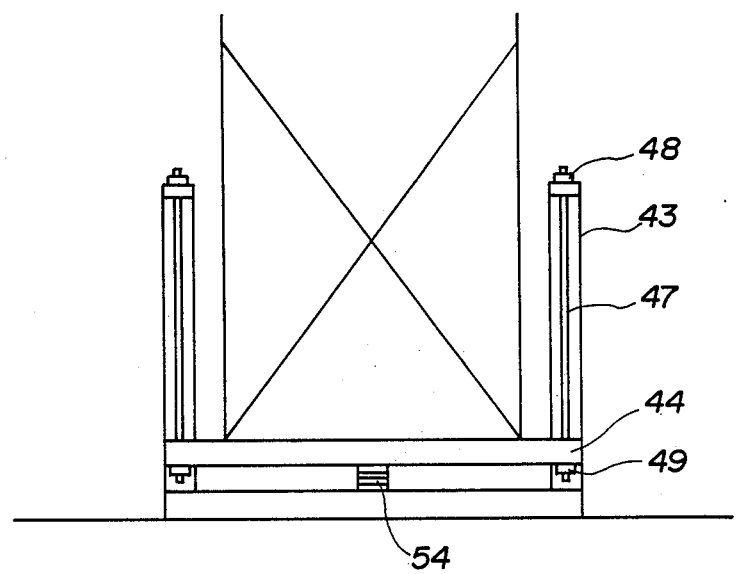
FIG. 14 shows the sectional view of the vibration-isolation device of FIG. 13.
Figure 15:
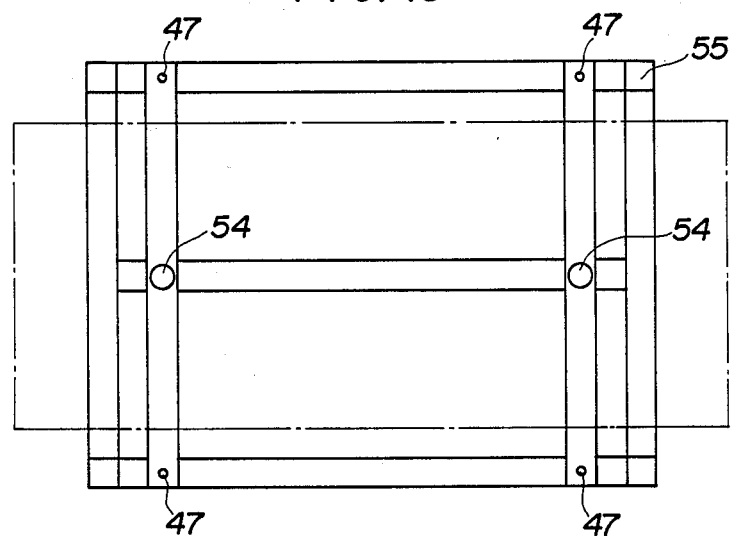
FIG. 15 shows the plan view of the vibration-isolation device of FIG. 13.

An example of this vibration-isolating device which supports a package type laboratory room is shown in the front elevation of FIG. 13, sectional view of FIG. 14 and plan view of FIG. 15.

Referring To FIG. 13, the package type room (52) of this example is supported partially by the bottom face (53) by means of the lower rack (44) of the vibration-isolating device. Lower rack (44) comprises a long body as seen in FIG. 14 which shows Section A-A' of FIG. 13. Lower rack (44) of this long body can be equipped with a damping device (54) at an intermediate position.

The vibration-isolating device of this example, comprising a skeleton of upper rack (43) and lower rack (44), may also be supported by a support pole and a long supporting body (55) as shown in FIG. 15.

With this example of the vibration-isolating device based on the present invention as described above, the vibration-isolating rubber used in the device elastically deforms from stationally state when vibration is given to the device while exhibiting vibration-isolating effect.

The natural period of this suspension type vibration-isolating effect.

The natural period of this suspension type vibration-isolating device, shown in these FIGS. 12, etc. can be obtained as follows.

$$f = \frac{1}{2\pi} \sqrt{\frac{g}{l} + \frac{48 \cdot Ep \cdot Ip \cdot Er \cdot Ir}{ml^2 (6h \cdot Ep \cdot Ip + l \cdot Er \cdot Ir)}} \quad T = f^{-1}$$

(Where
g = acceleration of moving force
l = length of pendulum
m = mass of structure
h = height of vibration-isolating rubber
Ep = modulus of elasticity for the pendulum
Ip = second moment of area for the pendulum
Er = modulus of elasticity for vibrationisolating rubber
Ir = second moment of area for vibrationisolating rubber)

The natural period (T) becomes 2.33 seconds, while the vertical and horizontal natural vibration frequencies of the vibration-isolating rubber become as follows:
fz (vertical) = 7.6 Hz
fII (horizontal) = 3.2 Hz The maximum response acceleration and shearing force, for a natural period (T) = 2.33 sec, are shown in Table 1. At that time, input seismic wave is assumed at EI-Centro 1940 NS and maximum input acceleration 320 gal.

TABLE 1

|  | max. response acceleration | Shearing force |
|---|---|---|
| Suspension type vibration isolation | 187 (Gal) | 1.19 (t) |
| Fixed foundation | 902 | 9.30 |

Obviously, the maximum response acceleration is reduced to about ½ of the input acceleration with the suspension type vibration-isolating device, namely about 1/5 compared with the fixed foundation.

Next, the vibration-isolating performance with the device based on the present invention is analyzed. Using a vibration can be cut off. Assuming fine vibration with the sine wave input speed of 1 gal, the vibration frequency of the input sine wave is changed. a simulation result of vibration isolation at that time is shown in FIG. 16.

Figure 16:
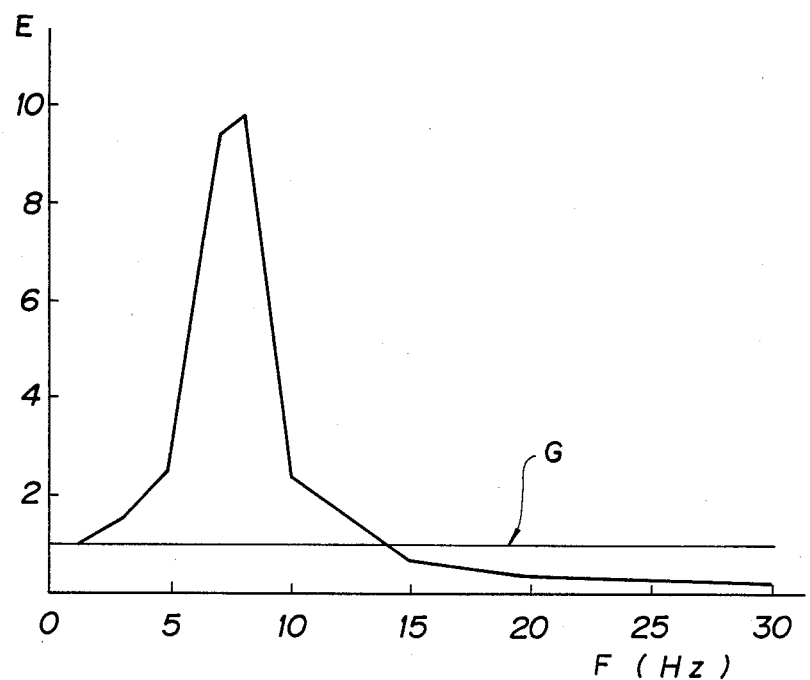
FIG. 16 indicated transmission characteristics of external fine vibration.

Referring to FIG. 16 that shows the transmission characteristics of external fine vibration (acceleration), vibration isolation effect can be expected in a vibration frequency range higher than 12~13 Hz.

However, this invention will not be limited only to the foregoing example, of course. Needless to say, various other aspects of the suspension type vibration-isolating devices can be materialized within the scope of the principles disclosed in the present invention.

The vibration-isolating device, according to the present invention, can apply to supporting a simple mobile package type laboratory room. In addition, said such a simple mobile laboratory room, supported by the vibration-isolating device, can be used as a laboratory room such as bio-clean room.

The mobile laboratory room constructed according to this invention, capable to combine the foregoing devices, apparatuses and structures, can be easily transported. For this purpose, engaging hooks or other fixed engaging means can be equipped on suitable positions of the housing structure, for conveniently engaging the pulling wire rope fixing onto a large trailer, etc.

In addition, the anchor device can also be equipped for connecting the upper air conditioning and exhausting unit and the laboratory unit.

Thus, a package type laboratory room, applicable to multiple purpose in a mobile way, can be realized by the present invention.

We claim:

1. A mobile, bio-laboratory room comprising a package type laboratory chamber that can be moved to various installation places, said package type laboratory chamber comprising:
   a housing structure having an airtight laboratory unit and an entrance unit, wherein the floor, walls and ceiling of the housing structure each have a double wall configuration;
   an air exhausting unit having a bio-hazard sterilizing filter equipped with a heating device mounted in the upper part of said housing structure; and
   drain processing unit having an automatic autoclave sterilizing device disposed in said airtight laboratory unit.

2. A mobile, bio-laboratory room comprising a package type laboratory chamber that can be moved to various installation places, said package type laboratory chamber comprising:
   a housing structure having an airtight laboratory unit and an entrance unit, wherein the floor, walls and ceiling of the housing structure each have a double wall configuration;
   an exhausting unit having a bio-hazard sterilizing filter equipped with a heating device mounted in the upper part of said housing structure;
   a drain processing unit having an automatic autoclave sterilizing device disposed in said airtight laboratory unit; and
   a suspension type vibration-isolating device including a pendulum for suspending said housing structure from a mounting rack or the like, wherein a vibration-isolating rubber member is provided between said pendulum and the rack such that the elastic deformation of said rubber member damps the vibration.

* * * * *